United States Patent [19]

Manesis

[11] Patent Number: 5,401,508
[45] Date of Patent: Mar. 28, 1995

[54] HYDROGEL COMPOSITIONS AND STRUCTURES MADE FROM SAME

[75] Inventor: Nick J. Manesis, San Jose, Calif.

[73] Assignee: Allergan, Inc., Irvine, Calif.

[21] Appl. No.: 55,933

[22] Filed: Apr. 30, 1993

Related U.S. Application Data

[63] Continuation of Ser. No. 823,266, Jan. 15, 1992, abandoned.

[51] Int. Cl.⁶ .................. A61F 2/14; C08F 218/00
[52] U.S. Cl. .................. 424/427; 514/954; 526/307.7; 623/5; 523/113
[58] Field of Search .......... 526/307.7; 424/427, 424/428; 514/954; 523/113; 623/5

[56] References Cited

U.S. PATENT DOCUMENTS

| | | | |
|---|---|---|---|
| 2,714,721 | 8/1955 | Stone, Jr. | 623/5 |
| 3,986,510 | 10/1976 | Higuchi et al. | 128/260 |
| 4,067,839 | 1/1978 | Schultz | 526/916 |
| 4,074,039 | 2/1978 | Lim et al. | 526/303 |
| 4,346,482 | 8/1982 | Tennant et al. | 128/305 |
| 4,388,436 | 6/1983 | Chen | 526/307.7 |
| 4,452,925 | 6/1984 | Kuzma et al. | 523/106 |
| 4,625,009 | 11/1986 | Izumitani et al. | 526/307.5 |
| 4,642,118 | 2/1987 | Kuroyanagi et al. | 623/15 |
| 4,676,790 | 6/1987 | Kern | 623/5 |
| 4,713,244 | 12/1987 | Bawa et al. | 424/429 |
| 4,715,858 | 12/1987 | Lindstrom | 623/5 |
| 4,740,498 | 4/1988 | Hirao et al. | 514/8 |
| 4,828,563 | 5/1989 | Muller-Lierheim | 623/16 |
| 4,919,659 | 4/1990 | Horbett et al. | 623/1 |
| 4,979,959 | 12/1990 | Guire | 623/66 |
| 4,983,181 | 1/1991 | Civerchia | 623/5 |
| 5,104,954 | 4/1992 | Mueller | 526/307.7 |

FOREIGN PATENT DOCUMENTS

| | | |
|---|---|---|
| 0224460 | 11/1986 | European Pat. Off. . |
| 0206025 | 12/1986 | European Pat. Off. . |
| 0311566 | 12/1989 | European Pat. Off. . |
| 2178963 | 8/1986 | United Kingdom . |
| 2215614A | 9/1989 | United Kingdom . |
| WO88/02622 | 3/1988 | WIPO . |
| WO8904153 | 5/1989 | WIPO . |
| 9000887 | 2/1990 | WIPO . |

OTHER PUBLICATIONS

Patent Abstracts of Japan, vol. 7, No. 105, May 7, 1983, (P-195) (1250).

Primary Examiner—Thurman K. Page
Assistant Examiner—Peter F. Kulkosky
Attorney, Agent, or Firm—Frank J. Uxa, Jr.; Gordon L. Peterson

[57] ABSTRACT

A hydrogel composition is disclosed which comprises water and a copolymer. In one embodiment, the copolymer is formed by reacting about 85% to about 99% by weight of at least one member selected from the group consisting of N,N-dimethylacrylamide, N,N-diethylacrylamide, N-methyl, N-ethylacrylamide and mixtures thereof; about 1% to about 15% by weight of at least one compound selected from the group consisting of alkyl acrylates, alkyl methacrylates and mixtures thereof wherein the alkyl group contains 1 to about 4 carbon atoms; and a minor, effective amount of at least one cross-linking agent. Such hydrogel compositions are effective as corneal inlays and onlays.

10 Claims, 1 Drawing Sheet

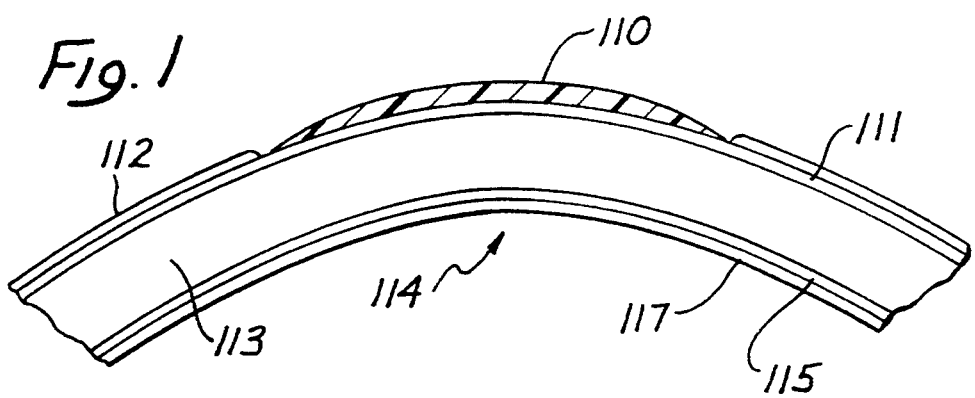
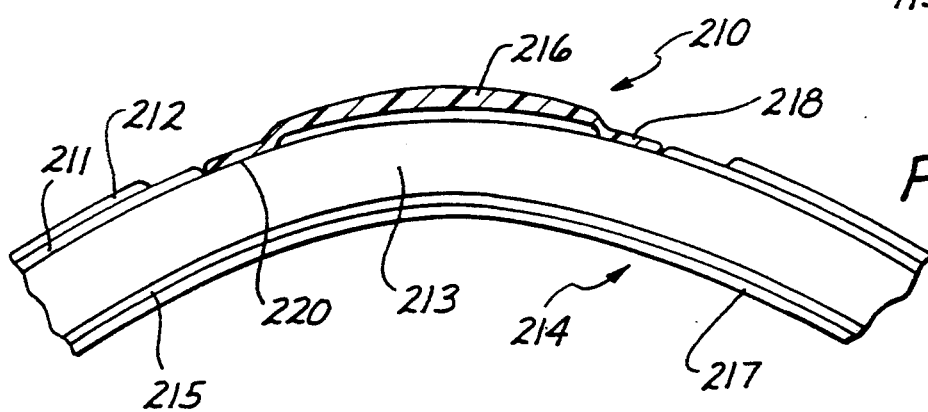
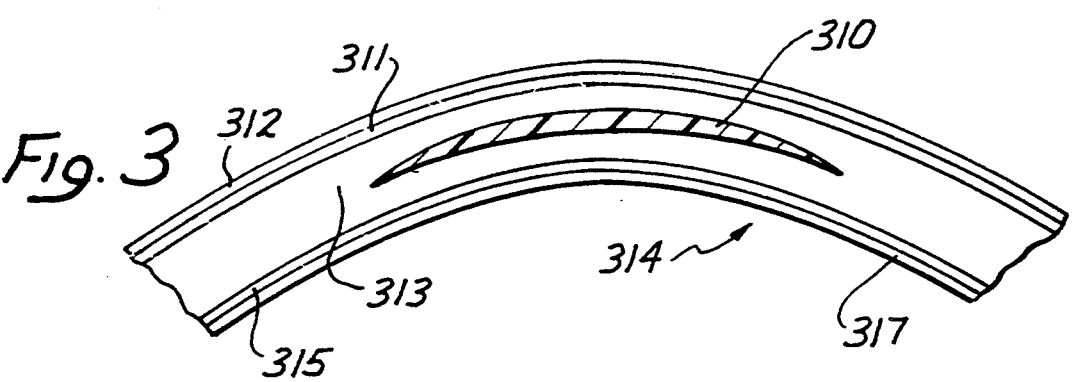
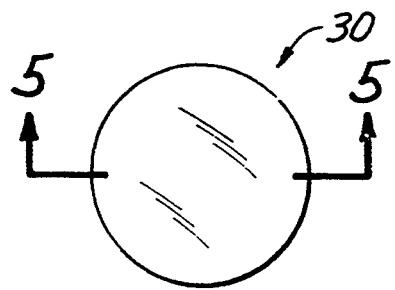
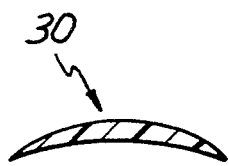

HYDROGEL COMPOSITIONS AND STRUCTURES MADE FROM SAME

This application is a continuation of application Ser. No. 07/823,266, filed Jan. 15, 1992, now abandoned.

SUMMARY OF THE INVENTION

The present invention relates to copolymers, hydrogel compositions including such copolymers and useful structures, such as corneal implants, other soft tissue implants and corneal contact lenses, made from hydrogel compositions. More particularly, the invention relates to such copolymers, hydrogel compositions and useful structures having defined chemical make-ups and beneficial characteristics and properties.

The cornea comprises five layers, including an outer layer of epithelial cells, Bowman's membrane immediately posterior of the cells, the stroma immediately posterior of Bowman's membrane, Descemet's membrane immediately posterior of the stroma and the endothelium immediately posterior of Descemet's membrane. A number of surgical operations involve implanting a corrective lens structure into or onto one or more of these corneal components. For example, in one form of eye surgery, the layer of epithelial cells is removed and a corrective lens structure is placed and secured at the location where the cells were removed. In another form of eye surgery, a portion of the layer of epithelial cells is removed and then a wedge-shaped annulus from Bowman's membrane and the underlying stroma is removed. An incision is then made from the posterior end of the resulting groove radially outwardly in an annular zone to define a flap. A corrective lens structure is attached by inserting the wing of the lens structure beneath the corneal flap and fixing, e.g., suturing, it in place. In addition, a corrective lens structure can be placed entirely within the stroma. This surgical procedure involves making an incision in the cornea to gain access to the stroma and also involves disrupting the stroma by placing a lens structure herein.

The lens structure for such corneal implants should be water permeable and nutrient permeable so that the lens structure does not unduly restrict the flow of nutrients to one or more parts of the cornea, for example, the corneal epithelium. A number of hydrogel-forming polymers have been suggested as corneal implant materials of construction because of their water permeability characteristics. However, the lens structure also should have sufficient tensile strength and tear resistance so as to maintain its structural integrity during long term use in the eye.

In general, hydrogel-forming polymers tend to be highly permeable, as indicated by a high equilibrium water content, or to have satisfactory or sufficient tensile strength and tear resistance, but not both. In other words, the prior art hydrogel-forming polymers often represented a compromise between water permeability and tensile strength/tear resistance properties.

It would clearly be advantageous to provide a hydrogel-forming polymer and hydrogel compositions, for example, for use in corneal implants, which have both high water/nutrient permeability and satisfactory or sufficient tensile strength/tear resistance.

Schultz U.S. Pat. No. 4,067,839 discloses a hydrophilic copolymer useful in the formation of hydrogel contact lenses. The copolymers disclosed include, per 100 parts of product, from 20 to 80 parts of N,N-($C_1$-$C_2$alkyl) acrylamide, 80 to 20 parts of $C_1$-$C_4$ alkyl acrylate and/or methacrylate esters, and small amounts of a cross-linking agent. The water contents disclosed for the hydrogels produced in accordance with this patent range from 27% to 79%. This patent does not disclose and is not concerned with corneal implants and the particular permeability problems involved with such implants.

SUMMARY OF THE INVENTION

New hydrogel-forming copolymers, hydrogel compositions and structures, such as corneal implants, other soft tissue implants and corneal contact lenses, made from the same have been discovered. Such copolymers, when equilibrated with water, in particular high concentrations of water, have sufficient tensile strength/tear resistance characteristics and outstanding water/nutrient permeability properties. The hydrogel compositions are preferably optically clear and can be very effectively used in making structures such as corneal implants, other soft tissue implants and corneal contact lenses. Such corneal implants and contact lenses can be formed either by direct molding into a finished lens structure or by molding in the form of a sheet, followed by machining into the desired structure. In short, the present hydrogel-forming copolymers, hydrogel compositions and structures have very good and useful characteristics and properties, and can be produced using various techniques, many of which are conventional and well known in the art.

In one broad aspect, the present invention relates to compositions comprising one or more of certain defined copolymers. These copolymers are formed by reacting about 85% to about 99%, preferably about 90% to about 98%, by weight of at least one N,N-dialkylacrylamide; about 1% to about 15%, preferably about 2% to about 10%, by weight of at least one ester component; and a minor, effective amount of at least one cross-linking agent. The at least one N,N-dialkylacrylamide is selected from N,N-dimethylacrylamide, N,N-diethylacrylamide, N-methyl, N-ethylacrylamide and mixtures thereof. The at least one ester component is selected from alkyl acrylates, alkyl methacrylates and mixtures thereof in which the alkyl group contains 1 to about 4 carbon atoms.

The present hydrogel compositions comprise water and at least one copolymer formed by reacting a major amount of at least one N,N-dialkylacrylamide, a minor amount of at least one ester component, as described herein, and a minor, effective amount of at least one cross-linking agent. The equilibrium water content of such hydrogel compositions is preferably at least 80%, more preferably at least about 85% and still more preferably at least about 90%, by weight, based on the total weight of the composition. Such high equilibrium water content hydrogel compositions have been found to have good and sufficient tensile strength/tear resistance characteristics and water/nutrient permeability properties to be highly effective for use in corneal implants, other soft tissue implants and corneal contact lenses.

DETAILED DESCRIPTION OF THE INVENTION

The copolymers according to the present invention are derived by reacting at least three comonomers. These are at least one member selected from N, N-dimethylacrylamide, N,N-diethylacrylamide, N-methyl, N-ethylacrylamide and mixtures thereof; at least one compound selected from alkyl acrylates, alkyl methacrylates and mixtures thereof, wherein the alkyl group contains 1 to about 4 carbon atoms; and a minor, effective amount of at least one cross-linking agent, such as a multiester of acrylic or methacrylic acid. In describing this invention, the weight percentages of these comonomers are given based on a total weight of the comonomers, unless otherwise specified. Of course, it is understood that the presently useful monomers are not present as such in the copolymer. Each monomer forms an integral part of the copolymer. However, for convenience and simplicity, in certain instances herein the individual monomers may be referred to as being present in the copolymer.

All of the copolymers contain at least one N,N-dialkylacrylamide, for example, as described above, in a major amount, that is, at least about 50%, by weight, preferably about 85% to about 99%, and more preferably about 90% to about 98% by weight. N,N-dimethyl acrylamide is the preferred acrylamide monomer because of its ready commercial availability.

Acrylic and/or methacrylic acid esters of alkanols containing from 1 to 4 carbon atoms are used as comonomers. These esters are present in the copolymers in a minor amount, that is less than about 50%, by weight, preferably about 1% to about 15%, and more preferably about 2% to about 10%, by weight.

The particular acrylate and/or methacrylate esters used depends upon the balance of properties wanted in the copolymer or hydrogel product. For example, methyl acrylate or methyl methacrylate usually impart higher tensile and compressive strengths, improved tear and nick resistance, and toughness to hydrogels. On the other hand, butyl acrylates usually contribute better elastic recovery for the hydrogels. A mixture of two or more alkyl acrylates and/or methacrylates can also be used to achieve a desired balance of properties, including the hydrophobic/hydrophilic balance considered desirable. Methyl methacrylate is particularly useful.

Acrylic and/or methacrylic derived multiesters are used as preferred cross-linking agents. The multiester comonomers are present in the copolymers in a minor effective amount by weight, preferably about 0.01% to about 4%, and more preferably about 0.02% to about 1.5% by weight. Examples of suitable multiesters include glycol dimethacrylates and diacrylates such as; ethylene glycol dimethacrylate and diacrylate, diethylene glycol dimethacrylate and diacrylate, triethylene glycol dimethacrylate and diacrylate, tetraethylene glycol dimethacrylate and diacrylate, polyethylene glycol dimethacrylate and diacrylate, 1,4-butylene glycol and 1,3-butylene glycol dimethacrylate and diacrylate. Other cross-linking agents can be used, of course, in minor effective amounts.

To insure uniformity of results, it is important to use carefully controlled polymerization reaction techniques. Control and removal of heat of reaction are also important. Reaction exotherms should be controlled to eliminate stress cracking and to obtain optimum conversion of monomers. Reagent impurity levels should be minimized. The specific temperatures employed for a particular reaction depend upon the specific comonomers used, on the specific reaction system employed and on the specific product desired. Low temperature polymerizations, such as those carried out below about 35° C., are preferred because they result in more complete polymerizations, higher molecular weight backbones, and products with lesser amounts of stress cracking.

The polymerization reactions may be carried out using known initiators, preferably in an oxygen-free atmosphere. A free radical initiator may be employed to initiate the polymerization. Representative free radical initiators which are suitable include isopropyl peroxydicarbonate, azobisisobutyronitrile, benzoyl peroxide, sodium persulfate alone or combined with sodium sulfoxylate formaldehyde, etc. Lower temperature free radical initiators, such as isopropyl peroxydicarbonate, are preferred because they tend to produce polymerization products with higher molecular weight backbones and with lower reaction exotherm peaks. Small amounts of these initiators, such as about 0.01% to 1% by weight, based on the total monomers, are often satisfactory.

Additionally, these polymerizations can be initiated by ultraviolet or high-energy radiation, for example, gamma ray radiation. For example, copolymerization initiated by ultraviolet light is possible. With high-energy particles or electromagnetic rays, it is likely that copolymerization can be initiated at room temperature or at even much lower temperatures. With high-energy radiation, cross-linking will occur even without the addition of cross-linking agents, such as the multiester cross-linking agents described above, although the presence of such agents is often preferred, and cross-linked copolymers produced in this manner are certainly within the scope of this invention.

The polymerization reaction to produce the present copolymers may be carried out by bulk or solution polymerization. When solvents are used, a common water miscible solvent for the comonomers can be chosen which avoids formation of a precipitate when the gel forms thereby avoiding cloudiness in the product. The present hydrogel products are preferably optically clear. Examples of suitable solvents include water, methanol, ethanol, t-butanol, ethylene glycol and combinations of these or other hydroxylic solvents. Tertiary butanol is a particularly useful solvent, where its use is appropriate, because it does not have a tertiary hydrogen that will chain transfer to limit backbone molecular weight. A small amount of solvent may be desirable to improve monomer conversion and to flatten the exotherm peak.

The copolymer product can be removed from its mold and cut into any desired shape. Appropriate polymerization vessels include tubes which produce products in the shape of sticks or casting cells to form sheets. Equilibration with water is accomplished by immersing the bulk polymerization products in water or other aqueous solutions, or by exchanging the solvent used in solution polymerizations with an aqueous solution. Sometimes an appropriate intermediate solvent can be used prior to exchange with water.

The present hydrogel compositions preferably include (at water/copolymer equilibrium) at least 80%, more preferably at least about 85% and still more preferably at least about 90%, by weight of water, based on the total weight of the composition.

The present hydrogel composition which includes a copolymer derived from about 85% to about 99% by weight of at least one dialkylacrylamide and about 1% to about 15% by weight of at least one ester component preferably has enhanced glucose diffusivity relative to a hydrogel composition including a copolymer derived from the same dialkylacrylamide and ester component from which the copolymer of the present hydrogel is derived, but which includes 70% by weight of the dialkylacrylamide and 30% by weight of the ester component.

Corneal implants, that is corneal inlays and corneal onlays, prepared from hydrogels wherein the copolymer has the above composition have been found to exhibit high equilibrium water contents as well as the required optical and mechanical properties, for example, tensile strength, tear resistance and water/nutrient permeability properties.

Corneal implants can be fabricated directly from nonhydrated copolymer in stick form by cutting, lathing and polishing. Alternately, the present copolymers can be molded directly into the shape of the lens structure of a corneal implant. The present hydrogel compositions can be used advantageously to form other soft tissue implants and corneal contact lenses. Other products which can be formed from the present hydrogel compositions include pessaries, semipermeable membranes, dental liners, hydrophilic coatings for hydrophobic substrates, biological implants such as carriers for therapeutic agents, connective tissue, and prosthetic devices, etc. These are only illustrative of the many uses for such hydrogels.

If the present copolymer compositions and hydrogel compositions are to be employed in soft tissue implants, for example, corneal implants, it is preferred that such compositions further comprise at least one cytophilic component in an amount effective to enhance the cytophilicity of the compositions. As used herein, the term "cytophilicity" refers to the growth and/or adhesion of the soft tissue, for example, the cornea, such as, the epithelial cells of the cornea, onto and/or to an implant including the present hydrogel composition. A cytophilic component, thus, is a component suitable to enhance the growth and/or adhesion of the soft tissue, for example, the cornea, onto and/or to such an implant.

The implant is preferably surgically attached, e.g., sutured and the like, to the living soft tissue, for example, cornea, and the cytophilic component is effective to promote the growth and/or adhesion of the living soft tissue onto and/or to the implant. After such growth and/or adhesion, the soft tissue cells themselves act to hold the implant in place, for example, after the sutures are removed or dissolved.

The cytophilic component may be associated with, e.g., attached or secured to, deposited on and the like, the implant at or near the external surface of the implant. At least a portion of the cytophillic component may be located as other than a surface coating, that is within the implant, for example, substantially uniformly within the implant. The cytophilic component is preferably substantially non-degradable and non-leachable or non-extractable from the implant at the conditions of use, i.e., in the patient's eye. In one particularly useful embodiment, the cytophilic component is chemically bonded, especially covalently bonded, to the implant. Such covalent bonding acts to hold the cytophilic component in association with the implant and to minimize the amount of cytophilic component that is lost during use.

Any suitable cytophilic component may be utilized in the present invention provided that it functions as described herein and has no substantial or unacceptable adverse effect on the eye or the patient being treated. Among the cytophilic components useful in the present invention are various growth factors and adhesion factors which promote the growth and adhesion, respectively, of the soft tissue, for example, corneal, cells, as described herein. In one embodiment, the cytophilic component is one or more proteins, peptides (meaning to include therein peptides, polypeptides and the like) and mixtures thereof. Useful cytophilic components include those selected from the group consisting of fibronectin, collagen, cell attachment protein, anti-gelatin factor, cold-insoluble globulin, chondronectin, laminin, epidermal growth factor (EGF), mussel adhesive protein, derivatives of each of the above and mixtures thereof. Fibronectin, derivatives of fibronectin, EGF, derivatives of EGF and mixtures thereof are especially useful.

In order to covalently bond the cytophilic component onto the implant, it may be necessary to derivatize either one or both of the cytophilic components and the copolymer or hydrogel composition included in the implant. The derivative or derivatives employed depend, for example, on the specific material used in the implant and on the specific cytophilic component used. In one particularly useful embodiment, one of the copolymer or cytophilic component is reacted with a difunctional component. One of the functional groups of the difunctional component reacts with, and is covalently bonded to, the copolymer material or the cytophilic component and the other functional group is available to be covalently bonded to the other of the copolymer material or the cytophilic component.

Any suitable difunctional component may be employed provided that it has the ability to covalently bond to both the specific copolymer and cytophilic component being used. Of course, the difunctional component should have no substantial adverse effect on the implant or on its use. Examples of difunctional components which may be employed with certain cytophilic components include aldehydes, such as glutaraldehyde and the like, and imides, such as carbodiimide and the like.

The difunctional component may be reacted with the copolymer material and cytophilic component in separate reaction steps or in a single reaction step with all reactants present.

In another embodiment, the covalent bonding of the copolymer material and cytophilic component may be promoted or induced by exposing these materials and components to radiation, e.g., gamma radiation, or to a plasma treatment.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is an enlarged axial, cross-sectional view showing an ocular device according to the present invention attached to a cornea.

FIG. 2 is an enlarged axial, cross-sectional view showing another ocular device according to the present invention attached to a cornea.

FIG. 3 is an enlarged axial, cross-sectional view showing an ocular device according to the present invention inserted in the stroma of a cornea.

FIG. 4 is a top plan view of a corneal contact lens in accordance with the present invention.

FIG. 5 is a cross-sectional view taken generally along line 5—5 of FIG. 4.

DETAILED DESCRIPTION OF THE DRAWINGS

Referring now to FIG. 1, an ocular device in the form of a corneal onlay, shown generally at 110, is situated on and attached (sutured) to the Bowman's membrane 111 of a living cornea 114. Also included in cornea 114 is epithelial cell layer 112, stroma 113, Descemet's membrane 115 and the endothelium 117. Corneal onlay 110, which is structured to correct one or more vision problems caused by defects in cornea 114 or in one or more other components of the eye, is set in place by surgically stripping or abrading away a desired area of the epithelial cell layer 112, placing corneal onlay 110 on this stripped area and securing corneal onlay 110 in place by suturing it to Bowman's membrane 111. The onlay 110 is placed with respect to the cornea 114 as shown in FIG. 1, so that the corneal onlay 110 is coaxial with the optical axis of the eye.

Once this surgical procedure is accomplished, epithelial cell layer 112 is to grow onto and attach or adhere to corneal onlay 110.

Corneal onlay 110 is made of the equilibrated hydrogel material produced in Example 1. Fibronectin, or a derivative of fibronectin, is covalently bonded to the polymeric material of corneal onlay 110. This fibronectin or fibronectin derivative is substantially uniformly distributed in the hydrogel material and accounts for about 1% by weight of the corneal onlay 110.

After the corneal onlay 110 is attached to Bowman's membrane 111, the fibronectin or derivative thereof in corneal onlay 110 acts to promote the growth of epithelial cell layer 112 onto corneal onlay 110 and the adhesion of epithelial cell layer 112 to corneal onlay 110. Ultimately, layer 112 completely overgrows corneal onlay 110 and is securely attached to corneal onlay 110. The rate at which this occurs is substantially faster when utilizing corneal onlay 110 relative to an onlay which contains no fibronectin or comparable substance. Corneal onlay 110 is very effective in long term use.

Of course, it is understood that the fibronectin or derivative thereof covalently bonded in corneal onlay 110 can be replaced, in whole or in part, by one or more other cytophilic components effective to promote the growth of epithelial cell layer 112 onto corneal onlay 110 and/or adhesion or attachment of epithelial cell layer 112 to corneal onlay 110.

Referring now to FIG. 2, an ocular device in the form of an alternate corneal onlay or epikeratophakia lenticule, shown generally at 210, is situated on and attached (sutured) to the Bowman's membrane 211 of a living cornea 214. Each element of cornea 214 in FIG. 2 which is also shown as an element of cornea 114 in FIG. 1 has a reference numeral increased by 100 relative to the same element shown in FIG. 1. Corneal onlay 210 comprises a circular optic 216 and a annular wing 218 surrounding the optic. The onlay 210 is placed with respect to the cornea 214 as shown in FIG. 2, with the optic 216 being coaxial with the optical axis of the eye and with the annular wing 218 being received in an annular abraded zone 220. This zone 220 is obtained by stripping and/or abrading a portion of the epithelial cell layer 212 and the Bowman's membrane 211. A useful apparatus and procedure for performing this stripping-/abrading are described in U.S. Pat. No. 4,834,748 which is incorporated in its entirety herein by reference.

Corneal onlay 210, and in particular optic 216, is structured to correct one or more problems caused by defects in cornea 214 or in one or more other components of the eye. Corneal onlay 210 is made of the equilibrated hydrogel material produced in Example 1. Fibronectin, or a derivative of fibronectin, is covalently bonded to the polymeric material of corneal onlay 210. This fibronectin or fibronectin derivative is substantially uniformly distributed in the hydrogel material and accounts for about 1% by weight of the corneal onlay 210.

Once the surgical procedure of securing corneal onlay 210 in place as shown in FIG. 2 is accomplished, epithelial cell layer 212 is to grow onto corneal onlay 210 and attach or adhere to corneal onlay 210.

After corneal onlay 210 is attached to cornea 214 as shown in FIG. 2, the fibronectin or derivative thereof in corneal onlay 210 acts to promote the growth of epithelial cell layer 212 onto corneal onlay 210 and adhesion of epithelial cell layer 212 onto corneal onlay 210. Ultimately, layer 212 completely overgrows corneal onlay 210 and is securely attached to corneal onlay 210. The rate at which this occurs is substantially faster when utilizing corneal onlay 210 relative to an onlay which contains no fibronectin or comparable substance. Corneal onlay 210 is very effective in long term use.

As with corneal onlay 110, other cytophilic components effective to promote the growth of epithelial cell layer 212 onto corneal onlay 210 and/or adhesion or attachment of epithelial cell layer 212 to corneal onlay 210 can be used in corneal onlay 210 all or a part of the fibronectin or derivative thereof.

Referring now to FIG. 3, an ocular device in the form of an intrastromal lens, shown generally at 310, is situated in the stroma 313 of living cornea 314. Each element of cornea 314 in FIG. 3 which is also shown as an element of cornea 114 in FIG. 1 has a reference numeral increased by 200 relative to the same element shown in FIG. 1. The lens 310 is coaxial with the optical axis of the eye and is placed and secured in the stroma 313 using conventional surgical procedures. Lens 310 is structured to correct one or more vision problems caused by defects in cornea 314 or in one or more other components of the eye.

Lens 310 is made of the equilibrated hydrogel material produced in Example 1. Fibronectin, or a derivative of fibronectin, is covalently bonded to the polymeric material of corneal onlay 310. This fibronectin or fibronectin derivative is substantially uniformly distributed in the hydrogel material and accounts for about 1% by weight of the corneal onlay 310.

After lens 310 is surgically implanted in stroma 313 as shown in FIG. 3, the fibronectin or derivative thereof in lens 310 acts to promote the adhesion of the tissue of the stroma 313 to lens 310. Ultimately, the stroma 313 is securely attached to lens 310. The rate at which this occurs is substantially faster when utilizing lens 310 relative to an intrastromal lens which contains no fibronectin or comparable substance. Lens 310 is very effective in long term use.

Other cytophilic components effective to promote the adhesion or attachment to stroma 313 to lens 310 can be used in lens 313 in place, in whole or in part, of the fibronectin or derivative thereof.

FIGS. 4 and 5 illustrate a corneal contact lens, shown generally at 30, in accordance with the present invention. Contact lens 30 is made of the equilibrated hydrogel material produced in Example 1. The material used in contact lens 30 does not include fibronectin or any other cytophilic components. Contact lens 30 is used by being placed in the eye in proximity to the cornea as is conventional for hydrophilic or soft contact lenses. Contact lens 30 is structured to improved the vision of the person or other animal in whose eye it is placed.

The following non-limiting examples illustrates certain aspects of the invention.

EXAMPLE 1

Methyl methacrylate (2.00 g, 0.020 mole) was added to N,N-dimethylacrylamide (37.67 g, 0.38 mole). This resulted in a reaction mixture having 0.05 weight fraction methyl methacrylate and 0.95 weight fraction N,N-dimethylacrylamide. The crosslinking agent ethylene glycol dimethacrylate (0.05% by weight based on total reaction mass) was then added. After 30 minutes of degassing with nitrogen, the reaction mixture was poured into a polypropylene sheet mold backed by aluminum foil. In other words, the reaction mixture was in direct contact with the aluminum foil. The mold was then sealed off from the atmosphere and subsequently exposed to 1 MRad gamma radiation. The cured hydrogel was peeled from the foil and then placed in balanced salt solution. After sufficient extraction (the balanced salt solution was exchanged with fresh solution every day for the next 3 days) various properties of the hydrogel material were determined.

This hydrogel material was determined to have an equilibrium water content of 92.2% with an effective glucose diffusivity of $5.6 \times 10^{-6} cm^2/sec$. There were no extractables detected, thereby indicating a highly efficient polymerization.

EXAMPLE 2

Methyl methacrylate (12.02 g, 0.12 mole) was added to N,N-dimethylacrylamide (47.58 g, 0.48 mole). This resulted in a reaction mixture having 0.20 weight fraction methyl methacrylate and 0.80 weight fraction N,N-dimethylacrylamide. The crosslinking agent ethylene glycol dimethacrylate (1.0% by weight based on total reaction mass) was then added. After 30 minutes of degassing with nitrogen, the reaction mixture was poured into a polypropylene sheet mold backed by aluminum foil. In other words, the reaction mixture was in direct contact with the aluminum foil. The mold was then sealed off from the atmosphere and subsequently exposed to 1 MRad gamma radiation. The cured hydrogel was peeled from the foil and then placed in balanced salt solution. After sufficient extraction (the balanced salt solution was exchanged with fresh solution every day for the next 3 days) various properties of the hydrogel material were determined.

This hydrogel material was determined to have an equilibrium water content of 83.1% with an effective glucose diffusivity of $5.17 \times 10^{-6} cm^2/sec$. There were no extractables detected, thereby indicating a highly efficient polymerization.

EXAMPLE 3

Methyl methacrylate (4.005 g, 0.04 mole) was added to N,N-dimethylacrylamide (35.69 g, 0.36 mole). This resulted in a reaction mixture having 0.10 weight fraction methyl methacrylate and 0.90 weight fraction N,N-dimethylacrylamide. The crosslinking agent ethylene glycol dimethacrylate (1% by weight based on total reaction mass) was then added. After 30 minutes of degassing with nitrogen, the reaction mixture was poured into a polypropylene sheet mold backed by aluminum foil. In other words, the reaction mixture was in direct contact with the aluminum foil. The mold was then sealed off from the atmosphere and subsequently exposed to 1 MRad gamma radiation. The cured hydrogel was peeled from the foil and then placed in balanced salt solution. After sufficient extraction (the balanced salt solution was exchanged with fresh solution every day for the next 3 days) various properties of the hydrogel material were determined.

This hydrogel material was determined to have an equilibrium water content of 82% with an effective glucose diffusivity of $2.68 \times 10^{-6} cm^2/sec$, a tensile strength of $17.2 g/mm^2$ and an elongation of 48%. There were no extractables detected, thereby indicating a highly efficient polymerization.

EXAMPLE 4(Comparative)

Methyl methacrylate (18.02 g, 0.18 mole) was added to N,N-dimethylacrylamide (41.63 g, 0.42 mole). This resulted in a reaction mixture having 0.30 weight fraction methyl methacrylate and 0.70 weight fraction N,N-dimethylacrylamide. The crosslinking agent ethylene glycol dimethacrylate (1.0% based on total reaction mass) was then added. After 30 minutes of degassing with nitrogen, the reaction mixture was poured into a polypropylene sheet mold backed by aluminum foil. In other words, the reaction mixture was in direct contact with the aluminum foil. The mold was then sealed off from the atmosphere and subsequently exposed to 1 MRad gamma radiation. The cured hydrogel was peeled from the foil and then placed in balanced salt solution. After sufficient extraction (the balanced salt solution was exchanged with fresh solution every day for the next 3 days) various properties of the hydrogel material were determined.

This hydrogel material was determined to have an equilibrium water content of only 79.4% with an effective glucose diffusivity of only $1.89 \times 10^{-6} cm^2/sec$.

Comparing Examples 1, 2 and 3 with Example 4, the present hydrogel compositions (Examples 1, 2, and 3) have substantially enhanced glucose diffusivity relative to the hydrogel composition of Example 4. This enhanced glucose diffusivity is an important benefit for materials useful in corneal implants. The higher the glucose diffusivity the more permeable the hydrogel composition is to nutrients. Nutrient permeability is an important property for corneal implants so that the implant does not unduly restrict one or more portions of the eye from having access to nutrients needed for good ocular health and cell growth and maintenance. Corneal implants made from the present high water content hydrogel compositions provide enhanced glucose diffusivity without compromising optical clarity or structural integrity.

While this invention has been described with respect to various specific examples and embodiments, it is to be understood that the invention is not limited thereto and that it can be variously practiced within the scope of the following claims.

What is claimed is:

1. A corneal implant comprising a lens body which is optically clear and structured and adapted to be surgically attached in or on the cornea of a mammalian eye, and is made of a hydrogel composition comprising water and a copolymer formed by reacting about 85% to about 99% by weight of at least one member selected from the group consisting of N,N-dimethylacrylamide, N,N-diethylacrylamide, N-methyl, N-ethylacrylamide and mixtures thereof; about 1% to about 15% by weight of at least one compound selected from the group consisting of, alkyl methacrylates and mixtures thereof, wherein the alkyl group contains 1 to 4 carbon atoms; and a minor, effective amount of at least one cross-linking agent, said lens body having sufficient glucose diffusivity so as to allow the cornea to which said lens body is to be surgically attached to have effective access to nutrients for corneal cell growth and maintenance, and having enhanced glucose diffusivity relative to a reference hydrogel composition of water and a copolymer derived from reacting a combination of monomers containing 70% by weight of said at least one member and 30% by weight of said at least one compound and an identical amount of said at least one cross-linking agent.

2. The corneal implant of claim 1 wherein water is present in said hydrogel composition in an amount of at least about 80% by weight, based on the total weight of said hydrogel composition.

3. The corneal implant of claim 1 wherein water is present in said hydrogel composition in an amount of at least about 90% by weight, based on the total weight of said hydrogel composition.

4. The corneal implant of claim 1 wherein said copolymer is formed by reacting about 90% to about 98% by weight of said at least one member and about 2% to about 10% by weight of said at least one compound.

5. The corneal implant of claim 1 wherein said hydrogel composition further comprises at least one cytophilic component in an amount effective to enhance the cytophilicity of said hydrogel composition.

6. A corneal implant comprising a lens body which is optically clear and is surgically attached in or on the cornea of a mammalian eye, and is made of a hydrogel composition comprising water and a copolymer formed by reacting a major amount by weight of at least one member selected from the group consisting of N,N-dimethylacrylamide, N,N-diethylacrylamide, N-methyl, N-ethylacrylamide and mixtures thereof; a minor amount by weight of at least one compound selected from the group consisting of alkyl acrylates, alkyl methacrylates and mixtures thereof, wherein the alkyl group contains 1 to 4 carbon atoms; and a minor, effective amount of at least one cross-linking agent, wherein the amount of water present is equal to at least 80%, based on the total weight of said hydrogel composition, said lens body having sufficient glucose diffusivity so as to allow the cornea to which said lens body is to be surgically attached to have effective access to nutrients for corneal cell growth and maintenance, and having enhanced glucose diffusivity relative to a reference hydrogel composition of water and a copolymer derived from reacting a combination of monomers containing 70% by weight of said at least one member and 30% by weight of said at least one compound and an identical amount of said at least one cross-linking agent.

7. The corneal implant of claim 6 wherein water is present in said hydrogel composition in an amount of at least about 90% by weight, based on the total weight of said hydrogel composition.

8. The corneal implant of claim 6 wherein said hydrogel composition further comprises at least one cytophilic component in an amount effective to enhance the cytophilicity of said hydrogel composition.

9. The corneal implant of claim 1 wherein said lens body has a glucose diffusivity of about $5.17 \times 10^{-6} cm^2/sec$ or greater.

10. The corneal implant of claim 6 wherein said lens body has a glucose diffusivity of about $5.17 \times 10^{-6} cm^2/sec$ or greater.

* * * * *

UNITED STATES PATENT AND TRADEMARK OFFICE
CERTIFICATE OF CORRECTION

PATENT NO. : 5,401,508
DATED : March 28, 1995
INVENTOR(S) : Manesis

It is certified that error appears in the above-indentified patent and that said Letters Patent is hereby corrected as shown below:

Column 1, line 8; delete "Summary" and insert in place thereof --Background--.

Column 12, line 5; delete "alkyl acrylates".

Column 12, lines 30-31 and lines 33-34; delete "5.17X10⁶cm²/sec or greater" and insert in place thereof --5.17 x $10^{-6}$ cm²/sec or greater--.

Signed and Sealed this

Twenty-fourth Day of September, 1996

Attest:

BRUCE LEHMAN

*Attesting Officer*    *Commissioner of Patents and Trademarks*